United States Patent Office.

JOHN Q. HILL, OF WORCESTER, MASSACHUSETTS.

Letters Patent No. 91,632, dated June 22, 1869.

IMPROVED CONFECTION.

The Schedule referred to in these Letters Patent and making part of the same.

*To all it whom may concern:*

Be it known that I, JOHN Q. HILL, of the city and county of Worcester, and State of Massachusetts, have invented a new and useful Composition for a Confection; and I do hereby declare the following to be a full, clear, and exact description of the same.

My invention consists in introducing into the composition of a confection, the substance known as slippery elm of commerce, or *Ulmus fulva* of the druggists, in such a manner as to give its properties to the same.

The mode of preparation is as follows:

For a cough-candy, I take one-quarter of a pound of finely-ground elm-bark, one ounce of pulverized licorice-root, sixteen grains of powdered ipecac., to twenty pounds of sugar, the powders to be mixed with a small portion of the sugar, and flavored, as by, say five drops each of oil of wintergreen, cassia, and peppermint, and the balance of the sugar prepared in the usual way, and these added before working, and the whole suitably worked into any desired form suitable for the market.

It is evident that different flavoring-substances may be used, and the other ingredients varied, as confectioners well know that different sugars allow of different quantities of substances to be used, and make a good confection, and in this kind of composition the weather seems to affect the bark sometimes, if cloudy and damp, whilst at others it has no effect. For these reasons, the precise amount above stated is not considered essential, nor is the name by which the confection may be called, the design being to secure protection under whatever name it may be used.

What I claim as new, and desire to secure by Letters Patent, is—

The use of elm-bark in a composition for a confection, substantially as above set forth and described, under whatever name it may be used or sold.

J. Q. HILL.

Witnesses:
J. W. HAMMOND,
JAS. G. ARNOLD.